(12) United States Patent
Aftoora

(10) Patent No.: US 6,706,309 B1
(45) Date of Patent: Mar. 16, 2004

(54) LIQUEFIED WATER SOLUBLE ACIDITY-REDUCING FORMULATION FOR FOOD AND BEVERAGE PRODUCTS

(76) Inventor: William F. Aftoora, 7006 Thornton Dr., Parma, OH (US) 44129

(*) Notice: Subject to any disclaimer, the term of this patent is extended or adjusted under 35 U.S.C. 154(b) by 0 days.

(21) Appl. No.: 09/674,369

(22) PCT Filed: Nov. 17, 1999

(86) PCT No.: PCT/US99/27251

§ 371 (c)(1),
(2), (4) Date: Oct. 27, 2000

(87) PCT Pub. No.: WO00/30476

PCT Pub. Date: Jun. 2, 2000

Related U.S. Application Data

(60) Provisional application No. 60/109,785, filed on Nov. 25, 1998.

(51) Int. Cl.[7] .............................. A23L 1/05; A23L 1/29; A23L 2/00
(52) U.S. Cl. .......................... 426/590; 426/74; 426/573; 426/578; 426/590
(58) Field of Search ................................ 426/590, 573, 426/578, 74

(56) References Cited

U.S. PATENT DOCUMENTS

| | | |
|---|---|---|
| 2,963,368 A | 12/1960 | Greenbaum |
| 3,462,384 A | 8/1969 | Kokoszka et al. |
| 3,946,121 A | 3/1976 | Eisenstadt |
| 4,328,115 A | 5/1982 | Metz |
| 4,414,198 A | 11/1983 | Michaelson |
| 4,461,778 A | 7/1984 | Vialatte nee Geolier |
| 4,744,986 A | 5/1988 | Luber et al. |
| 4,766,209 A | 8/1988 | Chen et al. |
| 4,853,237 A | 8/1989 | Prinkkila et al. |
| 5,098,722 A | 3/1992 | Tanaka et al. |
| 5,202,145 A | 4/1993 | Wisler et al. |
| 5,350,591 A | 9/1994 | Canton |
| 5,360,793 A | 11/1994 | Brooks |
| 5,455,235 A | 10/1995 | Takaichi et al. |
| 5,547,586 A | 8/1996 | Halperin et al. |
| 5,665,415 A | 9/1997 | Kligerman et al. |
| 5,721,003 A | 2/1998 | Zeller |
| 5,733,894 A | 3/1998 | Segall et al. |
| 5,747,071 A | 5/1998 | Segall et al. |
| 5,756,543 A | 5/1998 | Katsuragi et al. |
| 5,935,610 A | 8/1999 | McLean |
| 5,948,438 A | 9/1999 | Staniforth et al. |

FOREIGN PATENT DOCUMENTS

GB 840 623 A 7/1960

OTHER PUBLICATIONS

Patent Abstracts of Japan, vol. 009, No. 091, Applicant: Kagome KK, Patent Publication No. 59224674 (Dec. 17, 1984).
Patent Abstracts of Japan vol. 1996, No. 08, Applicant: Toyo Seikan Kaisha Ltd., Patent Publication No. 08084576 (Apr. 2, 1996).

*Primary Examiner*—Helen Pratt
(74) *Attorney, Agent, or Firm*—Renner, Kenner, Greive, Bobak, Taylor & Weber

(57) ABSTRACT

A liquefied acidity reducing formulation for food and beverage products contains an edible bicarbonate, a water soluble binder, water and optionally a preservative. A method is also provided to raise the pH of a consumable food or beverage product by mixing an effective amount of the liquefied acidity reducing formulation with a food product prior to consumption.

32 Claims, No Drawings

LIQUEFIED WATER SOLUBLE ACIDITY-REDUCING FORMULATION FOR FOOD AND BEVERAGE PRODUCTS

CROSS REFERENCE TO RELATED APPLICATIONS

This application is a national stage application of International Application No. PCT/US99/27251, filed Nov. 17, 1999, which claims the benefit of United States Provisional Application No. 60/109,785, filed Nov. 25, 1988.

TECHNICAL FIELD OF THE INVENTION

The present invention is directed to a water soluble acidity reducing formulation. The present invention is more particularly directed to a liquefied water soluble acidity reducing additive for food and beverage products containing an edible bicarbonate, a soluble binder, water and optionally a preservative.

BACKGROUND OF THE INVENTION

Many individuals are sensitive to high acid-containing food and beverage products, such as fresh citrus fruits, citrus fruit juices, foods containing citrus fruit juices and tomato sauce. In order to consume such foods and beverages without experiencing gastrointestinal pain or discomfort due to the high acid content of ingested foods, individuals having a sensitivity to high acid-containing foods must often ingest a commercially available antacid shortly before or after consumption of the food or beverage product.

Individuals with open mouth wounds and sores are also discouraged from consuming high acid containing food and beverage products to avoid experiencing local pain and irritation to the open mouth wounds and sores.

It is known in the art to provide food and beverage compositions, such as fitness drink powders, sweetener compositions and carbonating agents for coffee, containing both acidulent components and an edible bicarbonate. The addition of an edible bicarbonate to such a composition is usually necessary to raise the pH of the composition due to the addition of the acidulent components.

Eisenstadt, U.S. Pat. No. 3,946,121 discloses a non-caloric saccharine-based sweetener composition without a bitter after-taste comprising: (a) saccharine; (b) glucono delta lactone; and (c) an edible bicarbonate. The addition of an edible bicarbonate to the sweetener composition is necessary to raise the pH of the composition due to the addition of the glucono delta lactone.

Metz, U.S. Pat. No. 4,328,115, discloses an improved chemical acidogen system for foodstuffs, such as bovine milk and soybean milk to produce coagulated protein food products including cottage cheese, baker's cheese, cream cheese and "tofu" (soybean curd). The chemical acidogen system comprises hydrogen peroxide and an aliphatic dione having 2 to 6 carbon atoms, such as glyoxyl, pyruvaldehyde, diacetyl, 2,3-pentadione and 1,2-cyclohexanedione. Throughout the acidification process, the pH of the milk solutions are progressively lowered at a controlled rate to the protein coagulation stage (usually at a pH below 5.0) by the acid produced by the oxidation of the dione component of the acidogen system. The reference further discloses an embodiment of the chemical acidogen system comprising hydrogen peroxide, pyruvaldehyde and carbon dioxide-releasing sodium bicarbonate that may be added as a substitute for yeast in the leavening process for bakery products.

Vialatte nee Geolier, U.S. Pat. No. 4,461,778, discloses a composition for the deacidification of malic acid containing food liquids comprising: (a) calcium carbonate; (b) potassium bicarbonate; (c) calcium tartrate; and (d) calcium double salt of tartaric and malic acids to cause precipitation of tartromalate from the liquid. The reference discloses that the potassium bicarbonate is included to promote the elevation of the pH of the solution.

Prinkkilä et al. U.S. Pat. No. 4,853,237 discloses a fitness drink powder comprising: (a) a long chain glucose polymer; (b) sodium chloride; (c) sodium bicarbonate; (d) magnesium chloride; and (e) fruit acid, wherein said drink powder has a pH of 5.5 to 5.8.

Canton, U.S. Pat. No. 5,350,591, discloses a dry mix additive for a hot coffee beverage which induces a foam on top of the coffee. The dry mix additive comprises: (a) a sugar, such as monosaccharides including glucose and fructose and disaccharides including sucrose, maltose, lactose and mixtures thereof; (b) sodium bicarbonate; (c) a two-component releasing agent, wherein the first component is selected from the group consisting of monocalcium phosphate, fumaric acid and citric acid and wherein the second component is selected from the group consisting of sodium aluminum phosphate, sodium aluminum sulphate and dicalcium phosphate dihydrate; and (d) a hydrating agent, such as food-grade starch, gelatinized starch and unmodified cornstarch. The releasing agent reacts with sodium bicarbonate in a hot beverage to release carbon dioxide gas, thus resulting in a foaming effect.

It is, therefore, desirable to develop a liquefied water soluble, edible acid-reducing formulation capable of raising the pH of high acid-containing food and beverage products, such that individuals sensitive to high acid-containing foods and beverages can consume them without having to also ingest a commercially available antacid composition.

SUMMARY OF THE INVENTION

It is therefore an object of the present invention to provide a liquefied water soluble acidity reducing formulation containing an edible bicarbonate, a binder, water and optionally a preservative.

It is a further object of the present invention to provide a liquefied water soluble acidity reducing formulation that does not contain any acidulent components.

It is a further object of the present invention to provide a method to raise the pH of a consumable food or beverage product before consumption of said food or beverage.

These and other of the foregoing objects, together with the advantages thereof over the art known relating to acid reducing food formulations, which shall become apparent from the disclosure which follows, are accomplished by the invention as hereinafter described and claimed.

In general, the present invention provides a liquefied water soluble acidity reducing formulation comprising an edible bicarbonate, a soluble binder, water and optionally a preservative, wherein the liquefied acidity reducing formulation does not contain any acidulent components.

The present invention further provides a liquefied water soluble acidity reducing formulation for food and beverage products consisting essentially of an edible bicarbonate, a soluble binder, water and optionally a preservative.

The present invention further provides a method for raising the pH of a consumable food product before consumption of said food product comprising: mixing with said beverage, an effective amount of a liquefied, water soluble acidity-reducing formulation comprising: (i) an edible bicarbonate; (ii) a soluble binder; (iii) water; and (iv) optionally, a preservative, wherein the formulation substantially excludes acidulent components.

The present invention further provides a method for raising the pH of a consumable food or beverage product before consumption of said food or beverage product comprising: mixing with said food or beverage, an effective amount of a liquefied water soluble acidity reducing formulation consisting essentially of an edible bicarbonate, a soluble binder, water and optionally a preservative.

DETAILED DESCRIPTION OF THE INVENTION

The present invention is directed to a liquefied water soluble acidity reducing formulation comprising an edible bicarbonate, a soluble binder, water and optionally a preservative. Preferably, the formulation substantially excludes acidulent components. Most preferably, the liquefied, acidity-reducing formulation of the present invention consists essentially of sodium bicarbonate, a cornstarch binder and water. The main advantage of the present invention is that individuals sensitive to high levels of acidity may add the liquefied acidity reducing formulation of the present invention to a food or beverage product prior to consumption to avoid having to ingest an antacid before or after consumption of high acid-containing foods and beverages. Addition of the liquefied acidity-reducing formulation of the present invention to a highly acidic food or beverage product allows individuals with open mouth sores to comfortably consume the acidic food or beverage without irritation to the mouth wounds and sores.

The term "edible bicarbonate" used throughout the specification refers to the bicarbonate salts, such as sodium bicarbonate, potassium bicarbonate and calcium bicarbonate. The preferred edible bicarbonate is sodium bicarbonate.

Suitable water soluble binders for use with the liquefied acidity reducing formulation of the present invention include cornstarch, wheat flower, arrowroot, xanthan gum, gum arabic, guar gum, agar agar, locust bean gum, gum tragacanth, cellulose gums and mixtures thereof. Cornstarch is the preferred water soluble binder.

In another embodiment, about 0.5 to about 1 part of propylene glycol can be added to the formulation to moisten the binder and to prevent aggregation or clumping of the binder in the formulation. Preferably, the propylene glycol may be combined with the binder to form a slurry, which is then added to a mixture of water and soluble bicarbonate.

A preservative may be included in the liquefied acidity-reducing formulation of the present invention to increase the stability and shelf life of the formulation. Suitable preservatives are selected from the group consisting of sodium benzoate and potassium sorbate.

The liquefied acidity reducing formulation of the present invention comprises about 15% to about 20% edible bicarbonate by weight, based upon the weight of the edible bicarbonate, soluble binder and water. A preservative, if present, is generally in the amount of less than 1% based on the total weight of the liquefied acidity-reducing formulation.

A method is further included for raising the pH of an acid-containing consumable food or beverage product before consumption of said food or beverage product comprising mixing with said food or beverage product, an effective amount of a liquefied soluble acidity reducing formulation comprising an edible bicarbonate, preferably sodium bicarbonate, a soluble binder, preferably a cornstarch binder, water and optionally a preservative. Preferably, the formulation substantially excludes acidulent components. Most preferably, the liquefied, acidity-reducing formulation of the present invention consists essentially of sodium bicarbonate, a cornstarch binder and water.

In a preferred embodiment, the acidity reducing formulation of the present invention is provided as a liquid. In another embodiment, the acidity reducing formulation of the present invention may be reconstituted from a dry powder with water.

Prior to consumption, several drops of the liquefied acidity-reducing formulation of the present invention are mixed with a high acid-containing food or beverage product until the pH of said food or beverage product is neutralized. The amount of the acidity reducing formulation of the present invention that is to be added is dependent on the acidity of the food or beverage product. The amount added should be effective to raise the pH of the food or beverage product from about 0.5 to about 2 pH units, preferably from about 0.8 to about 1.2 pH units. The resulting food or beverage product can be consumed without pain or discomfort by individuals having a hypersensitivity to acid or who have open mouth wounds or sores.

In another embodiment, the acidity reducing formulation of the present invention may be added to a food product upon packaging or bottling. The packaged acid-containing food product should include an effective amount of the acidity reducing formulation of the present invention to raise the pH of the food product from about 0.5 to about 2 pH units, preferably from about 0.8 to about 1.2 pH units.

The liquefied acidity-reducing formulation of the present invention may be prepared by the steps of combining 4 parts by weight of an edible bicarbonate, such as at least one of sodium bicarbonate, calcium bicarbonate and potassium bicarbonate, 1 part by weight of a soluble binder, such as at least one of cornstarch, wheat flower and arrowroot, 16 parts by weight of cold water and optionally less than about 1% by weight of a preservative, based on the total weight of the formulation. The above formulation is brought to a boil over a medium to low heat. Once the formulation has been brought to a boil, the formulation is simmered over a low heat for two minutes. It is essential that the formulation is simmered at a low temperature to avoid foaming. Upon completion of the boiling process, the entire formulation may be chilled at 140° F. for pasteurization purposes. The resulting thickened liquefied acidity-reducing formulation can be packaged and stored in a bottle having a dropper means. In a preferred embodiment, the liquefied acidity-reducing formulation can be packaged and stored in a plastic squeeze bottle having a nipple dropper means. The resulting formulation can be conveniently added, dropwise, to a high acid-containing food or beverage product.

In an alternative method, the liquefied acidity-reducing formulation of the present invention may be prepared by adding the soluble binder and the edible bicarbonate to water having a temperature of about 100° F. to about 115° F. The components are blended with an immersible blender without any boiling of the formulation.

EXPERIMENTAL

The following examples are set forth to illustrate the methods of preparing the liquefied, water soluble acidity-reducing formulation of the present invention, and the effect of the formulation on the pH of food and beverage products in further detail. The following examples, however, should not be construed as limiting the present invention in any manner.

EXAMPLE 1

A liquefied acidity-reducing formulation was prepared by dissolving 1 part of cornstarch binder in 16 parts of cold water. The dissolved cornstarch mixture was brought to a boil by heating over a low heat. The boiled cornstarch mixture was removed from the heat, and 4 parts of sodium bicarbonate was added to the cornstarch mixture. The mixture of cornstarch and sodium bicarbonate was blended with a high speed immersible blender to produce a homogenous mixture of sodium bicarbonate and cornstarch. Once blended, the mixture was allowed to cool to about 100° F. After cooling, 0.333 parts of xanthan gum binder was added to the mixture and blended with a high speed immersible blender. The formulation exhibited excellent pourability into a dropper bottle, and was easily dispensed dropwise, into a food or beverage product.

EXAMPLE 2

A liquefied acidity reducing formulation was prepared in cool water without any boiling. The formulation was prepared by dissolving 4 parts of sodium bicarbonate in 16 parts of water having a temperature of about 105° F. The dissolved sodium bicarbonate mixture was blended with 0.5 parts of xanthan gum binder with a high speed immersible blender. The formulation exhibited excellent pourability into a dropper bottle, and was easily dispensed dropwise, into a food or beverage product.

EXAMPLE 3

Another liquefied acidity reducing formulation was prepared in cool water without any boiling. The formulation was prepared by dissolving 4 parts of sodium bicarbonate in 16 parts of water having a temperature of about 105° F. The dissolved sodium bicarbonate mixture was blended with 1 part of gum arabic. 0.5 parts of xanthan gum binder was added to the mixture of sodium bicarbonate, gum arabic, and water, and was blended thoroughly with a high speed immersible blender. Again, the formulation exhibited excellent pourability into a dropper bottle, and was easily dispensed dropwise, into a food or beverage product.

The effect of a liquefied, water soluble acidity-reducing formulation of the present invention comprising sodium bicarbonate, cornstarch binder and water, on the change in pH levels was tested on several commonly consumed high acidity-containing food products. The test method and results are described hereinbelow.

The initial pH of each of Sample Nos. 1–7 was determined with a pH measuring instrument manufactured by Hanna Instruments. Prior to measuring the pH of the samples, the pH measuring instrument was calibrated with buffer solutions of pH 4.0 and 10.0. The initial pH, prior to the addition of the liquefied acidity-reducing formulation of the present invention, of each sample was measured and recorded. Three drops of the liquefied acidity-reducing formulation of the present invention was added to four ounces of each of Sample Nos. 1–7. The change in the pH levels of the samples containing the liquefied acidity-reducing formulation of the present invention was measured with the pH measuring instrument as described hereinabove. The data showing the increase in the pH of Sample Nos. 1–7 is contained in Table I below.

TABLE I

| Sample No. | Initial pH of Food Product | pH of Food Product after treatment. |
| --- | --- | --- |
| 1 | 3.0 | 4.1 |
| 2 | 2.8 | 3.7 |
| 3 | 2.3 | 3.2 |
| 4 | 2.6 | 3.5 |
| 5 | 1.7 | 2.5 |
| 6 | 5.2 | 6.4 |
| 7 | 4.1 | 5.0 |

As shown in Table I above, Sample No. 1 comprising freshly squeezed orange juice, exhibited an increase of 1.1 pH units following the addition of the liquefied, water soluble acidity-reducing formulation of the present invention. Sample No. 2 comprising orange juice from concentrate, Sample No. 3 comprising freshly squeezed grapefruit juice, Sample No. 4 comprising grapefruit juice from concentrate, and Sample No. 7 comprising tomato sauce, each exhibited an increase of 0.9 pH units following the addition of the liquefied, water soluble acidity-reducing formulation of the present invention. Sample No. 5 comprising freshly squeezed lemon juice and Sample No. 6 comprising fresh brewed black coffee, each exhibited an increase of 0.8 pH units following the addition of the liquefied, water soluble acidity-reducing formulation of the present invention.

As shown and described in Table I above, the liquefied, acidity-reducing formulation of the present invention effectively increases the pH of commonly consumed high acidity containing food products.

The liquefied acidity reducing formulation of the present invention can effectively raise the pH of high acid containing food products including fruit juices such as, orange juice, grapefruit juice, lemon juice, vegetable juices, coffee, tomato sauces, chili, soups and alcoholic beverages, such as margaritas and wines.

The addition of about 2 to about 3 drops of the liquefied water soluble acidity-reducing formulation of the present invention to six ounces of a high acidity-containing food product effectively raises the pH of said food product, without altering the taste of the food product to which it is added. It is preferred that initially 2 to 3 drops of the acidity-reducing formulation of the present invention are added, dropwise, to six ounces of a food product. Depending on the initial pH of the food product to be consumed and an individual's own preference, up to 10 drops can be added, dropwise, to six ounces of a high acidity-containing food product. It should be noted that the addition of more than 10 drops of the acidity-reducing formulation of the present invention to six ounces of a high acidity-containing food product may result in excessive effervescence, due to the evolution of gas produced by the edible bicarbonate, and the alteration of the original taste of the food product.

Based on the foregoing disclosure, it should now be apparent that the use of the liquefied, water soluble acidity-reducing formulation of the present invention will carry out the objects set forth hereinabove. The examples disclosed hereinabove are for illustrative purposes only, and the present invention is not limited to them. Thus, the scope of the invention shall include all modifications and variations that may fall within the scope of the attached claims and equivalent embodiments.

I claim:

1. A liquefied soluble acidity reducing formulation comprising from about 15% to about 20% by weight of an edible bicarbonate, a soluble binder, water, and optionally a preservative, wherein the weight of said edible bicarbonate is based on the total weight of the edible bicarbonate, soluble binder and water, and wherein the formulation does not contain acidulent components.

2. The liquefied soluble acidity reducing formulation, according to claim 1, wherein the edible bicarbonate is selected from the group consisting of sodium bicarbonate, calcium bicarbonate and potassium bicarbonate.

3. The liquefied soluble acidity reducing formulation, according to claim 1, wherein the soluble binder is selected from the group consisting of cornstarch, wheat flower, arrowroot, xanthan gum, gum arabic, guar gum, agar agar, locust bean gum, gum tragacanth, cellulose gums and mixtures thereof.

4. The liquefied soluble acidity reducing formulation, according to claim 3, wherein the soluble binder is cornstarch.

5. The liquefied soluble acidity reducing formulation, according to claim 3, wherein the soluble binder is xanthan gum.

6. The liquefied soluble acidity reducing formulation, according to claim 5, wherein the formulation includes from about 0.5 to about 1 part of propylene glycol.

7. The liquefied soluble acidity reducing formulation, according to claim 1, wherein the preservative is present and is selected from the group consisting of sodium benzoate and potassium sorbate.

8. A liquefied soluble acidity reducing formulation consisting essentially of about 15% to about 20% by weight of an edible bicarbonate, a soluble binder, water and optionally a preservative, wherein the formulation does not contain acidulent components, and wherein the weight of the edible bicarbonate is based on the weight of the edible bicarbonate, soluble binder and water.

9. The liquefied soluble acidity reducing formulation, according to claim 8, wherein the edible bicarbonate is selected from the group consisting of sodium bicarbonate, calcium bicarbonate, potassium bicarbonate.

10. The liquefied soluble acidity reducing formulation, according to claim 8, wherein the soluble binder is selected from the group consisting of cornstarch, wheat flower, arrowroot, xanthan gum, gum arabic, guar gum, agar agar, locust bean gum, gum tragacanth, cellulose gums and mixtures thereof.

11. The liquefied soluble acidity reducing formulation, according to claim 8, wherein the preservative is selected from the group consisting of sodium benzoate and potassium sorbate.

12. The liquefied soluble acidity reducing formulation, according to claim 8, wherein said formulation includes less than about 1% by weight of said preservative, based on the weight of the bicarbonate and the soluble binder.

13. A liquefied soluble acidity reducing formulation comprising an edible bicarbonate, a soluble binder, water and optionally a preservative, wherein the formulation includes from about 0.5 to about 1 part of propylene glycol and does not contain acidulent components.

14. The liquefied soluble acidity reducing formulation, according to claim 13, wherein the edible bicarbonate is selected from the group consisting of sodium bicarbonate, calcium bicarbonate and potassium bicarbonate.

15. The liquefied soluble acidity reducing formulation, according to claim 13, wherein the soluble binder is selected from the group consisting of cornstarch, wheat flower, arrowroot, xanthan gum, gum arabic, guar gum, agar agar, locust bean gum, gum tragacanth, cellulose gums and mixtures thereof.

16. The liquefied soluble acidity reducing formulation, according to claim 13, wherein the preservative is present and is selected from the group consisting of sodium benzoate and potassium sorbate.

17. The liquefied soluble acidity reducing formulation, according to claim 13, wherein said formulation includes from about 15% to about 20% by weight of said edible bicarbonate, based on the weight of the edible bicarbonate, soluble binder and water.

18. The liquefied soluble acidity reducing formulation, according to claim 13, wherein said formulation includes less than about 1% by weight of said preservative, based on the weight of the bicarbonate and the soluble binder.

19. A method for raising the pH of a consumable food or beverage product before consumption of said food or beverage product comprising:

mixing with said food or beverage product, an effective amount of a liquefied soluble acidity reducing formulation comprising: (i) from about 15% to about 20% by weight of an edible bicarbonate; (ii) a soluble binder; (iii) water and (iv) optionally, a preservative, wherein the weight of the edible bicarbonate is based on the total weight of the edible bicarbonate, soluble binder and water, and wherein the formulation does not contain acidulent components.

20. The method for raising the pH of a consumable food or beverage product before consumption, according to claim 19, wherein said food or beverage product is a beverage.

21. The method for raising the pH of a consumable food or beverage product before consumption, according to claim 19, wherein an effective amount of said formulation is added to said food or beverage product to raise the pH of the food or beverage product from about 0.5 at about 2 pH units.

22. A method for raising the pH of a consumable food or beverage product before consumption of said food of beverage product comprising:

mixing with said food or beverage product, an effective amount of a liquefied soluble acidity reducing formulation consisting essentially of: (i) an edible bicarbonate; (ii) a soluble binder; (iii) water; and (iv) optionally, a preservative, wherein the formulation does not contain acidulent components.

23. The method for raising the pH of a consumable food or beverage product before consumption, according to claim 22, wherein said food or beverage product is a beverage.

24. The method for raising the pH of a consumable food or beverage product before consumption, according to claim 22, wherein an effective amount of said formulation is added to said food or beverage product to raise the pH of the food or beverage product from about 0.5 to about 2 pH units.

25. A packaged acid-containing food product containing a pH increasing amount of a formulation consisting essentially of an edible bicarbonate, a soluble binder, water and optionally a preservative.

26. The packaged acid-containing food product, according to claim 25, wherein said formulation excludes acidulent components.

27. The liquefied soluble acidity reducing formulation, according to claim 1, wherein said formulation includes less than about 1% by weight of said preservative, based on the weight of the bicarbonate and the soluble binder.

28. A liquefied soluble acidity reducing formulation consisting essentially of an edible bicarbonate, a soluble binder, water and optionally a preservative, wherein the formulation includes from about 0.5 to about 1 part of propylene glycol and does not contain acidulent components.

29. The liquefied soluble acidity reducing formulation, according to claim 28, wherein the edible bicarbonate is selected from the group consisting of sodium bicarbonate, calcium bicarbonate, potassium bicarbonate.

30. The liquefied soluble acidity reducing formulation, according to claim 28, wherein the soluble binder is selected from the group consisting of cornstarch, wheat flower, arrowroot, xanthan gum, gum arabic, guar gum, agar agar, locust bean gum, gum tragacanth, cellulose gums and mixtures thereof.

31. The liquefied soluble acidity reducing formulation, according to claim 28, wherein the preservative is selected from the group consisting of sodium benzoate and potassium sorbate.

32. The liquefied soluble acidity reducing formulation, according to claim 28, wherein said formulation includes less than about 1% by weight of said preservative, based on the weight of the bicarbonate and potassium bicarbonate.

* * * * *